United States Patent
Eby

[11] 3,721,374
[45] March 20, 1973

[54] LAMP MOUNT FOR AUTOMOTIVE VEHICLES

[76] Inventor: George W. Eby, 1015 Molalla Avenue, Oregon City, Oreg. 97045

[22] Filed: Aug. 10, 1971

[21] Appl. No.: 170,471

[52] U.S. Cl. ............................ 224/42.1 B, 240/7.1
[51] Int. Cl. .................................................. B60r 11/00
[58] Field of Search ........ 224/42.1 F, 42.1 G, 42.1 B, 224/42.1 R; 248/227; 113/116 HA; 49/441, 491; 72/DIG. 3; 83/5

[56] References Cited

UNITED STATES PATENTS

| | | | |
|---|---|---|---|
| 3,460,728 | 8/1969 | Adamson | 224/42.1 R |
| 3,256,577 | 6/1966 | Bright | 49/491 X |
| 3,261,520 | 7/1966 | Andersson | 224/42.1 E |

Primary Examiner—Gerald M. Forlenza
Assistant Examiner—Jerold M. Forsberg
Attorney—Berman, Davidson and Berman

[57] ABSTRACT

A mounting bracket assembly for supporting an emergency light on the roof of an automobile. The bracket assembly is composed of a pair of aligned downwardly facing channel bars to the inner ends of which is adjustably connected an emergency lamp mounting plate. The flanges of the channel bars are notched at their bottom edges to make them sufficiently flexible to conform to the curvature of the automobile roof. The outer ends of the channel bars have anchoring hooks engageable around the outer top rim portions of the opposite doorways of the automobile.

7 Claims, 10 Drawing Figures

PATENTED MAR 20 1973 3,721,374
SHEET 1 OF 2
FIG. 1.
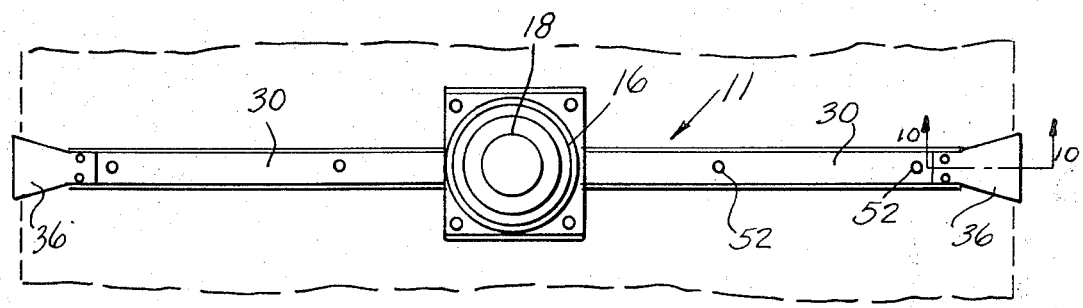
FIG. 2.
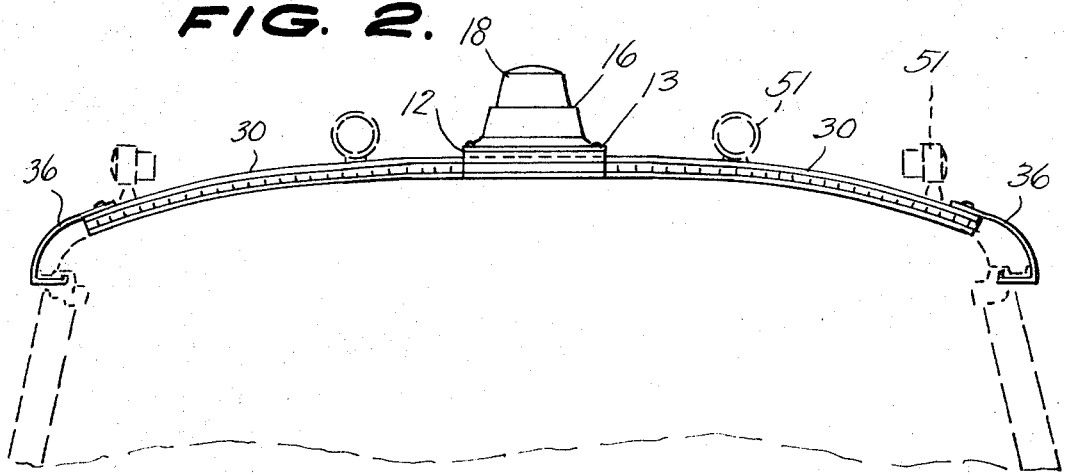
FIG. 3.
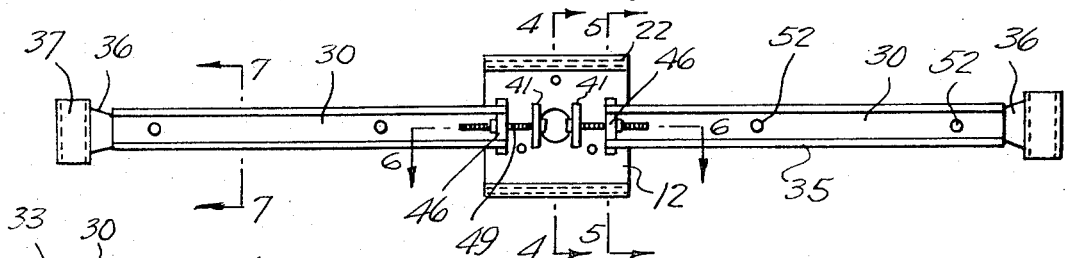
FIG. 10.
INVENTOR.
GEORGE W. EBY,
BY
Berman, Davidson & Berman,
ATTORNEYS.

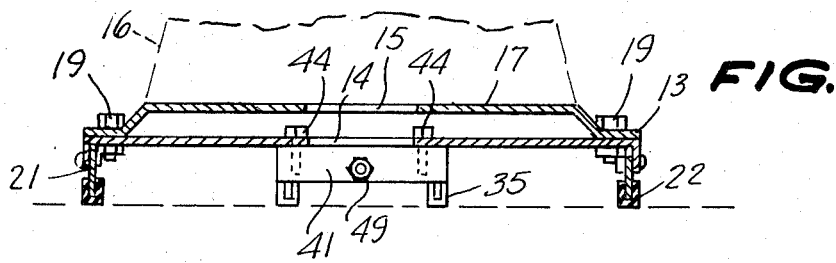
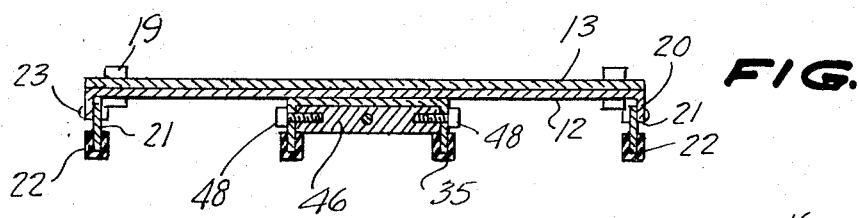
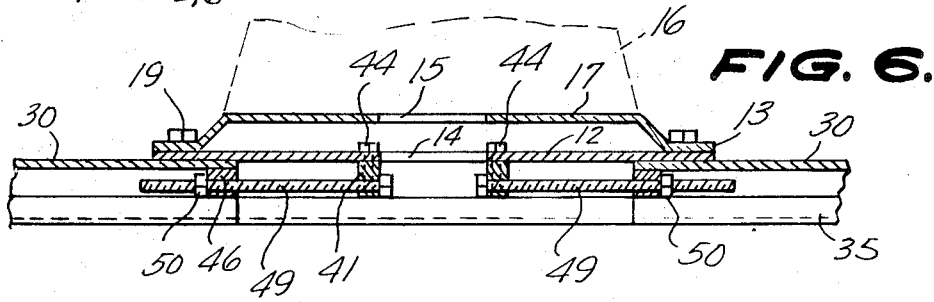
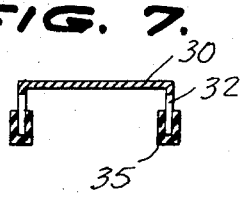
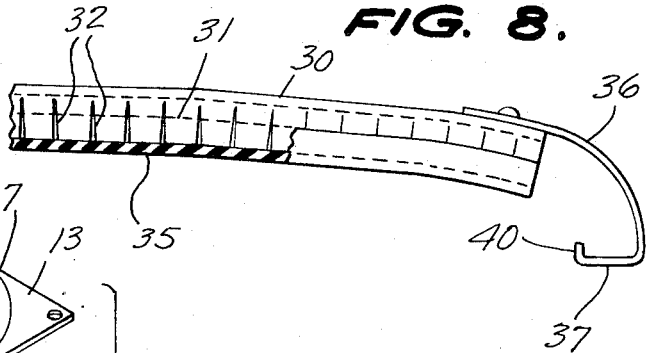
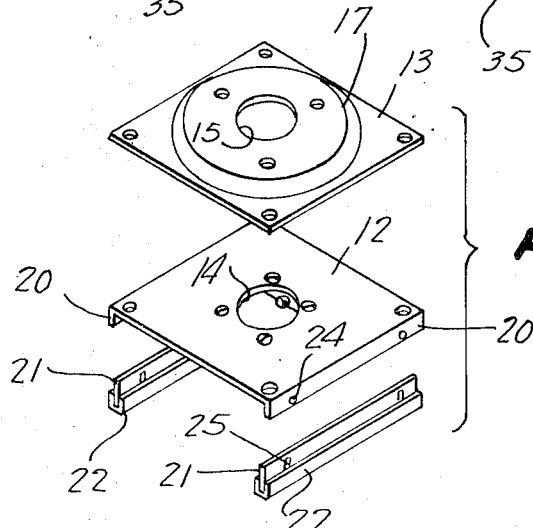

LAMP MOUNT FOR AUTOMOTIVE VEHICLES

This invention relates to lamp supporting devices, and more particularly to an emergency lamp mounting assembly for use in supporting an emergency lamp on the roof of an automobile.

The main object of the invention is to provide a novel and improved mounting bracket device adapted to be detachably connected to the roof of an automobile for supporting an emergency lamp, or the like, thereon, the device being simple in construction, being easy to install, and being flexible so that it can readily conform to the curvature of the automobile roof on which it is mounted.

A further object of the invention is to provide an improved mounting bracket assembly for supporting one or more emergency lamps, or similar devices, on the roof of an automobile, the bracket assembly involving inexpensive components, being durable in construction, being relatively compact in size, and being easy to adjust so that it conforms accurately to the curvature of the automobile roof surface on which it is installed.

Further objects and advantages of the invention will become apparent from the following description and claims, and from the accompanying drawings, wherein:

FIG. 1 is a top plan view of an improved lamp mounting assembly constructed in accordance with the present invention.

FIG. 2 is a front elevational view of the lamp mounting assembly of FIG. 1 shown in relation to the roof portion of an automobile, the automobile being represented in dotted view.

FIG. 3 is a bottom plan view of the lamp mounting assembly of FIGS. 1 and 2.

FIG. 4 is an enlarged transverse vertical cross-sectional view taken substantially on line 4—4 of FIG. 3.

FIG. 5 is an enlarged vertical transverse cross-sectional view taken substantially on line 5—5 of FIG. 3.

FIG. 6 is an enlarged fragmentary longitudinal vertical cross-sectional view taken substantially on line 6—6 of FIG. 3.

FIG. 7 is en enlarged transverse cross-sectional view taken substantially on line 7—7 of FIG. 3.

FIG. 8 is an enlarged fragmentary elevational view, partly in cross-section, of a portion of the lamp mounting assembly of FIGS. 1 to 7, showing the notched side flange structure of a channel bar forming part of the assembly and showing a resilient deformable protective channel employed with the notched side flange.

FIG. 9 is an enlarged perspective view showing the lamp mount plate and associated elements, as employed in the assembly of FIGS. 1 to 8, the parts being shown in separated positions.

FIG. 10 is an enlarged fragmentary cross-sectional view taken substantially on line 10—10 of FIG. 1, with the device mounted on the roof of an automobile, said view showing the manner in which an anchor hook element engages around a top rim portion of the doorway of the automobile on which the assembly is mounted.

Referring to the drawings, 11 generally designates an improved lamp mount assembly constructed in accordance with the present invention. The assembly 11 comprises a rectangular lamp mount plate 12 on which a similarly-shaped lamp housing bottom wall plate member 13 is adapted to be secured. As shown in FIG. 9, the members 12 and 13 are provided with central apertures 14 and 15 for the wiring and socket structure of the associated lamp, not shown, which is contained in a suitable housing shell member 16 attached in a conventional manner on the central elevated portion 17 of member 13, the shell member 16 being adapted to receive a conventional light-transmitting dome 18 and being provided with means for securing said dome therein. The housing bottom wall member 13 is secured to the lamp mount plate 12 in any suitable manner, for example, by corner bolts 19. Mount plate 12 is provided with depending side flanges 20,20 to which are secured respective vertical supporting strip members 21,21 provided at their bottom edges with resilient deformable protective channels 22,22 engageable with the subjacent roof surface of a vehicle on which the assembly is to be mounted.

The strips 21 are secured to the flanges 20 by means of suitable fastening screws or other conventional fastening members 23 engaged through apertures 24 in the flanges 20 and slots 25 in the strips 21.

Designated at 30,30 are respective downwardly facing channel bars which are disposed on opposite sides of the lamp mount plate 12 and whose inner ends are connected to the lamp mount plate on opposite sides of the central aperture 14 in alignment with each other in the manner presently to be described.

The side flanges 31 of the first-named channel bars 30 are provided with uniformly spaced V-shaped notches 32 opening at the bottom edges of said side flanges and of substantial height, whereby the channel bars are rendered substantially flexible, the height of the notches 32 being for the major portions of the height of the side flanges, enabling the channel bars to accurately conform to the curvature of the roof 33 of a motor vehicle on which the lamp mounting assembly is installed. The notched bottom edges of the channel bars 30 are provided with resilient deformable protective channels 35 so as to engage the roof surface 33 without scratching or otherwise marring said surface, and so as to provide a frictional gripping action on the roof surface, preventing the assembly from slipping therealong. As shown in FIG. 8, the notches 32 are relatively closely spaced and are of substantial height, providing a high degree of flexibility for the channel bars 30 and enabling them to readily conform to the roof curvature of a wide range of different designs of automobiles.

Secured to the outer ends of the respective channel bars 30 are relatively wide hook members 36,36 which flare outwardly in width, as shown in FIG. 3, and which are provided with hook bight portions 37 shaped to engage around the top marginal rim portions of the opposite doorways of a motor vehicle, for example, in the manner shown in FIG. 10. Thus, in the typical arrangement illustrated in FIG. 10, the hook bight portion 37 of an anchor member 36 extends around the gutter element 38 associated with a side doorway 39 and is lockingly inter-engaged with the top rim portion of the doorway in the manner illustrated in this figure. Thus, the bight portion 37 may be of substantial length and may be provided with an upstanding end flange 40 which facilitates its holding action when tension is exerted on the hook member 36. As shown in FIGS. 8 and 10, the main body portion of the hook member 36 is arcuately curved downwardly and outwardly so that the bight portion 37 is directed inwardly and so that tension exerted on the hook member will cause the bight portion 37 to exert a reliable gripping action on the associated doorway top rim portion.

Respective transverse depending anchor blocks 41,41 are secured to the bottom surface of the lamp mount plate 12 on opposite sides of the aperture 14, as by respective pairs of fastening screws 44,44. Respectively transversely extending anchor blocks 46,46 are secured in the inner ends of the channel bars 30,30, as by respective pairs of fastening screws 48,48, in the manner illustrated in FIG. 5. Engaged through the blocks 41 and 46 on opposite sides of the aperture 14 are respective tightening bolts 49,49 provided with nuts 50,50, whereby the nuts 50 cooperate with the screws 49 when the screws 49 are rotated to pull the respective channel bars 30,30 inwardly toward each other, whereby to tighten the bracket assembly when it has been mounted on the roof of an automobile, for example, in the manner illustrated in FIGS. 1 and 2. Thus, the adjustment may be made prior to mounting and the hooks 36 may be forced over the opposite top rim portions of the motor vehicle doorways, or alternatively, the screws 49 may be tightened after the assembly is in place, by employing a suitable wrench and inserting it through the aperture 14, the nuts 50 being sufficiently large so that they will be held against rotation when the heads of the bolts 49 are rotated. The lamp housing and other associated structure carried by the member 13 may be secured thereafter on the mount plate 12 by fastening the member 13, carrying the housing and associated parts, to mount plate 12 by means of the above-mentioned corner bolts 19.

The wiring associated with the emergency lamp is housed in the channels 30,30 and may be led in any suitable manner to the interior of the vehicle for connection to the vehicle battery through a suitable control switch. Thus, the wiring is protectively covered by the channel bars 30,30 and is protected against damage as well as hidden from view.

The channel bars 30 are provided with a plurality of additional spaced apertures 52,52 so that additional emergency lamps 51 or some other devices may be mounted on the channels along with the main emergency lamp assembly located at the center portion of the assembly.

While a specific embodiment of an improved emergency lamp mounting assembly for a motor vehicle has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A lamp mount for automotive vehicles comprising a lamp mount plate, respective fastening bar members underlying opposite end portions of said lamp mount plate, means adjustably connecting said fastening bar members to said opposite end portions of said plate, said bar members being formed with spaced notches at their bottom edges to render the bar members flexible so as to conform to the curvature of an automotive vehicle, and anchor means at the outer ends of said fastening bar members for lockingly engaging with the top marginal portions of opposite doorways of the vehicle, wherein said bar members are downwardly facing channels and said spaced notches are formed in the side flanges of said channels, wherein said anchor means comprises respective inwardly facing hook members secured to the outer ends of said channels, and wherein said means adjustably connecting said fastening bar members to said opposite end portions of the plate comprises a pair of depending transverse projections carried by said plate, respective transverse blocks secured in the channels, and threaded fastening bolt means extending through the transverse projections and blocks.

2. The lamp mount of claim 1, and wherein said hook members are of relatively wide strip material and flare outwardly in width from said channels.

3. The lamp mount of claim 1, and wherein said fastening bolt means comprises respective headed bolts extending through each transverse projection and through the transverse block of one of the channels, and a fastening nut threaded on each bolt.

4. The lamp mount of claim 3, and wherein the transverse blocks are secured in the inner ends of the respective channels.

5. The lamp mount of claim 4, and wherein said lamp mount plate is provided with depending edge flanges spaced outwardly from and extending parallel to the side flanges of said channels.

6. The lamp mount of claim 5, and respective depending side strips secured to said edge flanges and resiliently deformable protective channels on the bottom edge portions of said side strips.

7. The lamp mount of claim 6, and additional resilient deformable protective channels on the notched bottom edge portions of the side flanges of said channels.

* * * * *